US011982115B2

(12) United States Patent
Catone

(10) Patent No.: US 11,982,115 B2
(45) Date of Patent: May 14, 2024

(54) DOOR PANELS-FRAME ASSEMBLY AND CABINET PROVIDED WITH SAID DOOR PANELS-FRAME ASSEMBLY

(71) Applicant: Cesare Catone, Singapore (SG)

(72) Inventor: Cesare Catone, Singapore (SG)

(*) Notice: Subject to any disclaimer, the term of this patent is extended or adjusted under 35 U.S.C. 154(b) by 703 days.

(21) Appl. No.: 17/264,117

(22) PCT Filed: Aug. 22, 2019

(86) PCT No.: PCT/EP2019/072528
§ 371 (c)(1),
(2) Date: Jan. 28, 2021

(87) PCT Pub. No.: WO2020/048789
PCT Pub. Date: Mar. 12, 2020

(65) Prior Publication Data
US 2021/0310291 A1 Oct. 7, 2021

(30) Foreign Application Priority Data
Sep. 6, 2018 (IT) ........................ 102018000008400

(51) Int. Cl.
*E05D 15/58* (2006.01)
*E05D 15/10* (2006.01)

(52) U.S. Cl.
CPC ......... *E05D 15/58* (2013.01); *E05D 15/1042* (2013.01); *E05D 2015/1055* (2013.01);
(Continued)

(58) Field of Classification Search
CPC ................ E05D 15/58; E05D 15/1042; E05D 2015/1055; E05D 2015/586; E05Y 2201/62; E05Y 2800/122; E05Y 2900/20
See application file for complete search history.

(56) References Cited

U.S. PATENT DOCUMENTS 4,974,912 A * 12/1990 Rask ..................... E06B 3/5045 312/331
2004/0046488 A1* 3/2004 Hogan .................. E06B 3/5045 312/322

(Continued)

FOREIGN PATENT DOCUMENTS

| | | | |
|---|---|---|---|
| EP | 1449999 | A1 | 8/2004 |
| FR | 2818591 | A1 | 6/2002 |
| JP | H1162370 | A | 3/1999 |

OTHER PUBLICATIONS

International Search Report for corresponding PCT/EP2019/072528, dated Oct. 21, 2019.

(Continued)

*Primary Examiner* — Matthew W Ing
(74) *Attorney, Agent, or Firm* — Egbert, McDaniel & Swartz, PLLC

(57) ABSTRACT

A door panels-frame assembly includes a first revolving door panel, a second door panel that slides relative to the first door panel, and a supporting frame fixed to the door panels in order to movably support the door panels. The supporting frame has first sliding mechanism fixed to the second door panel to make the second door panel slide relative to the first door panel, the sliding mechanism including a fixed slide where a slider slides. The slide has an inclined end relative to the sliding direction of the second door panel when moved by the first sliding mechanism, in such a way to push the second door panel outwards when it is opened.

12 Claims, 22 Drawing Sheets

(52) U.S. Cl.
CPC ..... *E05D 2015/586* (2013.01); *E05Y 2201/62* (2013.01); *E05Y 2800/122* (2013.01); *E05Y 2900/20* (2013.01)

(56) References Cited

U.S. PATENT DOCUMENTS

| | | | | |
|---|---|---|---|---|
| 2007/0159037 | A1 | 7/2007 | Hoffman | |
| 2011/0072724 | A1* | 3/2011 | Scruggs | E05D 15/08 49/129 |
| 2015/0008811 | A1* | 1/2015 | Ishii | E06B 3/5045 312/322 |
| 2017/0130518 | A1 | 5/2017 | Christenson et al. | |
| 2017/0275937 | A1 | 9/2017 | Park | |

OTHER PUBLICATIONS

Written Opinion of the International Searching Authority for corresponding PCT/EP2019/072528, dated Oct. 21, 2019.

* cited by examiner

DOOR PANELS-FRAME ASSEMBLY AND CABINET PROVIDED WITH SAID DOOR PANELS-FRAME ASSEMBLY

The present patent application for industrial invention relates to a door panels-frame assembly and to a cabinet provided with said door panels-frame assembly.

Door panels-frame assemblies are known which can be fixed to cabinets, window and/or door frames or partitions. Said door panels-frame assemblies comprise one or more door panels and one frame that supports said door panels. The door panels can be of revolving or sliding type.

JPH1162370 discloses a cabinet comprising a door panels-frame assembly comprising a frame, a revolving door panel that is hinged to the frame, and a sliding door panel that is slidingly mounted on slides fixed to the revolving door panel. The sliding door panel lies on a parallel plane that does not coincide with the plane where the revolving door panel lies. In order to access a compartment of the cabinet, it is necessary to make the sliding door panel slide towards the revolving door panel. At the end of the sliding movement, the revolving door panel and the sliding door panel are pushed in outward rotation. Said door panels-frame assembly is impaired by the fact that its front volume is equal to a length of the revolving door panel, both during the rotation of the door panels and when the door panels are open to provide access to the compartment of the cabinet.

US2017130518 discloses a cabinet comprising a door panels-frame assembly comprising a frame, a first door panel that is hinged to the frame, and a second door panel that is slidingly mounted in the first door panel. In order to access a compartment of the cabinet, it is necessary to push the door panels outwards, in such a way to rotate the door panels outwards. During the rotation of the door panels, the second door panel can slide in the first door panel in such a way to be inserted in the first door panel. Said door panels-frame assembly is impaired by the fact that its front volume is equal to a length of the first door panel, both during the rotation of the door panels and when the door panels are open to provide access to the compartment of the cabinet.

US2017275937 discloses a door panels-frame assembly comprising a revolving door panel that is hinged to the frame, a first door panel that slides relative to the revolving door panel and a second door panel that slides relative to the first sliding door panel. Said door panels-frame assembly is impaired by the fact that its front volume is equal to the length of the revolving door panel, both during the rotation of the door panels and when the door panels are open to provide access to the compartment of the cabinet.

EP1449999 discloses a cabinet comprising a door panel-frame assembly comprising a frame and only one door panel fixed to the frame by means of moving means. Because of the moving means, the door panel can slide outwards and rotate in such a way that a portion of the door panel is disposed in parallel position to a lateral wall of the frame. Such a door panel-frame assembly is impaired by the fact that, when the door panel is open, a portion of the door panel protrudes frontally from the frame, causing a front hindrance.

FR2818591 discloses a door panel-frame assembly for vehicles comprising a frame, a first revolving door panel that is hinged to the frame, and a sliding door panel that is slidingly mounted relative to the revolving door panel. In order to open the door panels, it is necessary to make the sliding door panel slide towards the revolving door panel and rotate the door panels outwards. Such a door panel-frame assembly is impaired by the fact that, when the door panels are open, the door panels protrude frontally from the frame, causing a front hindrance.

The purpose of the present invention is to overcome the drawbacks of the prior art by disclosing a cabinet in which the door panels are disposed in coplanar adjacent position when they are closed, and no front hindrance is generated when the door panels are in open position.

Another purpose is to disclose a cabinet in which the door panels can simply and rapidly go from the opening position to the closing position or vice versa by pushing only one door panel.

These purposes are achieved according to the invention with the characteristics of the appended independent claim 1.

Advantageous embodiments appear from the dependent claims.

The cabinet of the invention is defined by claim 1.

The advantages of the cabinet according to the invention are manifest because the provision of the second sliding means makes the door panels slide in such a way not to be a hindrance.

For the sake of clarity, the description of the cabinet according to the invention continues with reference to the attached drawings, which have a merely illustrative, not limiting value, wherein.

Figure 1:
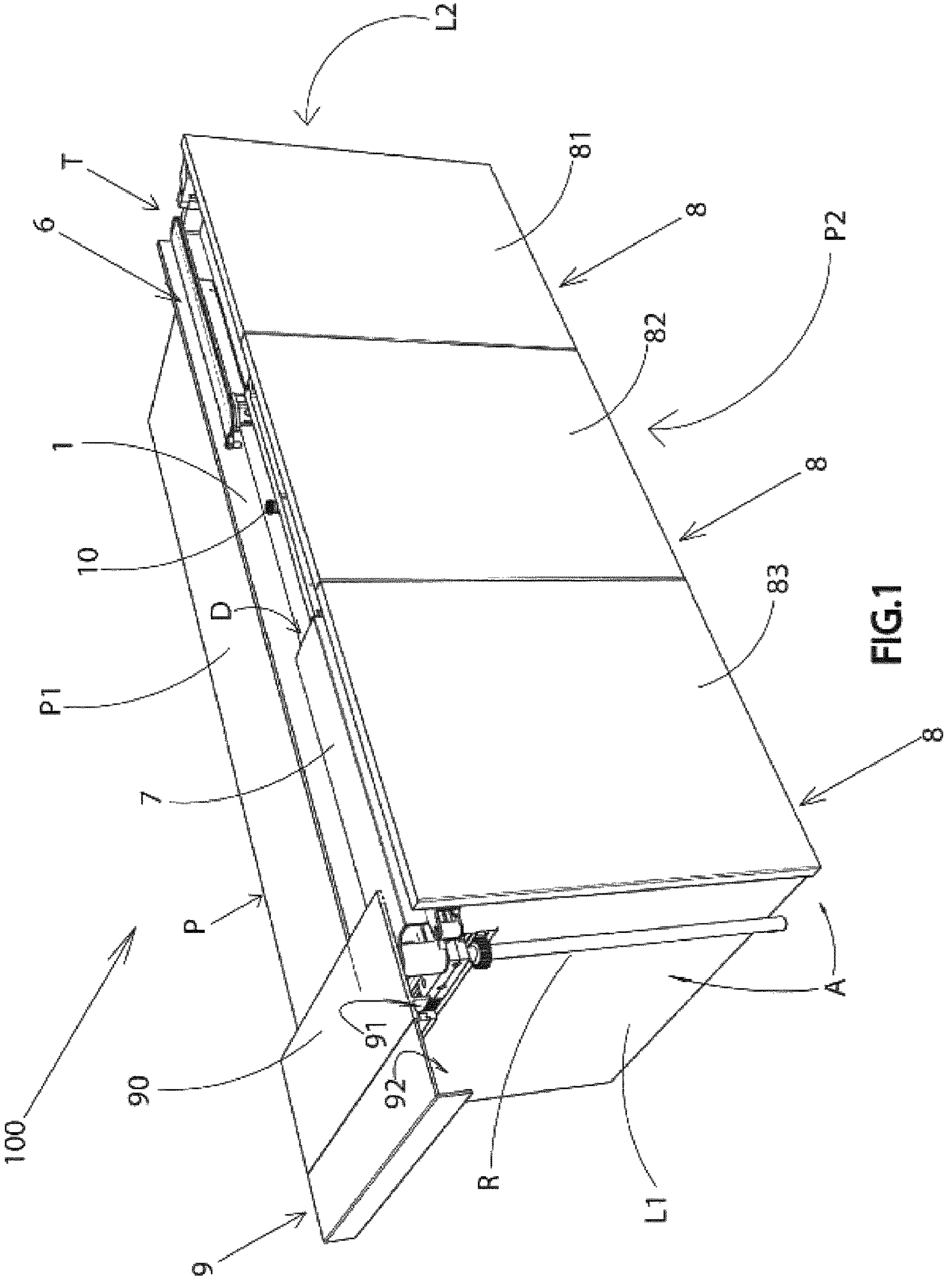
FIG. 1 is a perspective view of the cabinet according to the invention, with the door panels in closed position.
Figure 2:
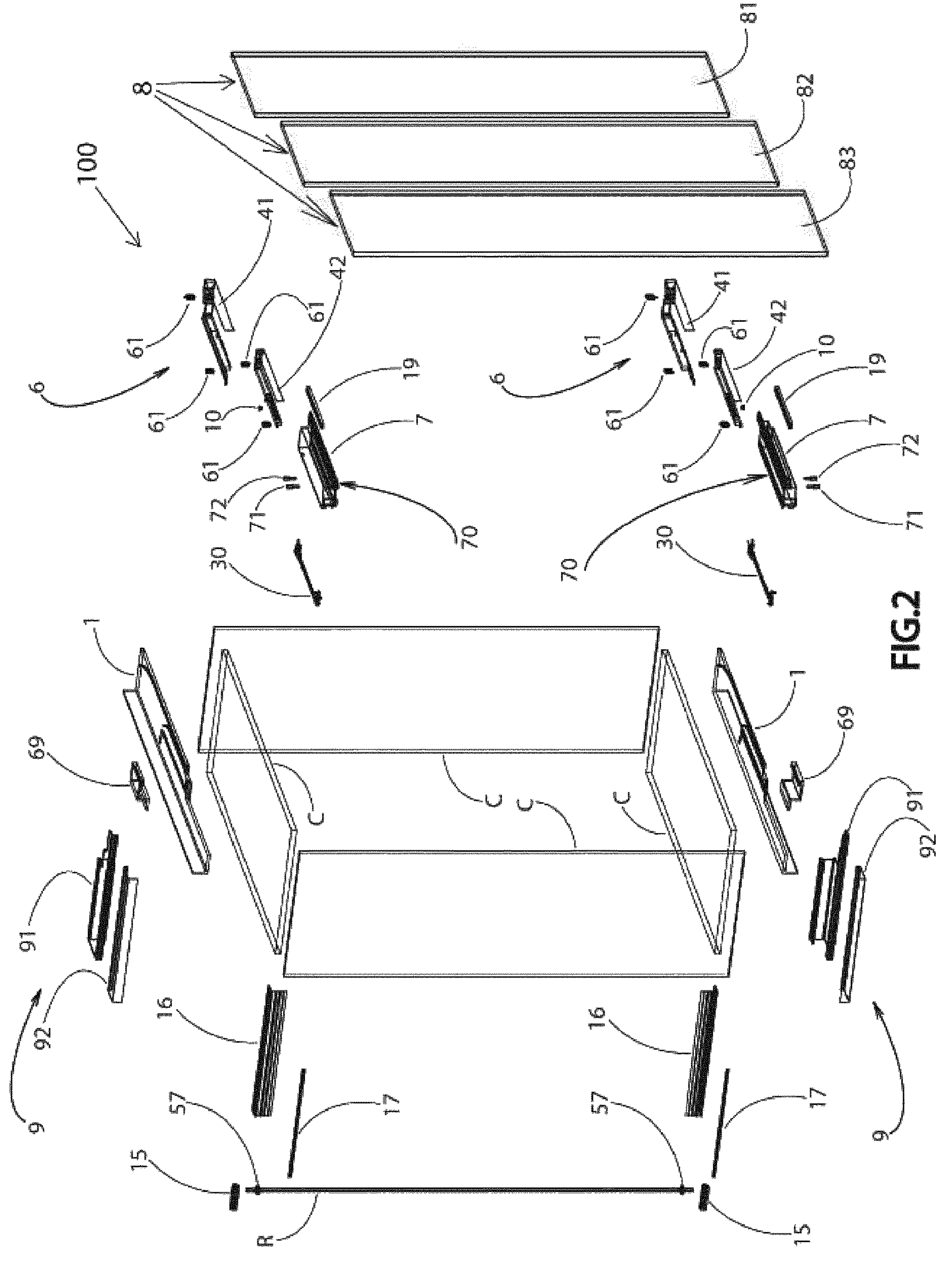
FIG. 2 is an axonometric exploded view of the cabinet according to the invention.

With reference to FIGS. 1 and 2, a cabinet according to the invention is disclosed, which is generally indicated with reference numeral (100).

The cabinet (100) of the invention comprises:

walls (P) that define a compartment;

a door panels-frame assembly (A) fixed to the walls (P) of the cabinet, in such a way to provide or prevent the access to the compartment of the cabinet.

The walls (P) of the cabinet comprise a first lateral wall (L1), a second lateral wall (L2), an upper panel (P1) and a lower panel (P2). The compartment of the cabinet can be accessed from a front opening.

The door panels-frame assembly (A) comprises:

door panels (8); and two supporting frames (T) fixed in upper position and in lower position to the door panels (8) in order to movably support the door panels.

The door panels (8) comprise a first revolving door panel (83), a second door panel (82) that slides relative to the first door panel (83) and a third door panel (81) that slides relative to the second door panel (82).

The door panels (8) are suitable for closing the front opening that provides access to the compartment of the cabinet. When they are in closed position, the door panels (8) are coplanar.

Each supporting frame (T) comprises:

first sliding means (6) to make the second door panel (82) and the third door panel (81) slide towards the first door panel (83) and vice versa;

rotation means (7) to rotate the three door panels (8); and second sliding means (9) to make the three door panels (8) slide in parallel direction to a lateral wall of the cabinet.

The first sliding means (6) are fixed to a wall of the cabinet and to the second and third door panel (82, 81) to make the third door panel (81) slide relative to the second door panel (82) and to automatically make the second door panel and the third door panel (82, 81) slide relative to the first door panel (83) along a sliding direction (S) of the second door panel (82) when moved by the first sliding means. Such a sliding direction (S) is parallel to a plane where the second door panel and the third door panel (82, 81) lie in closed position.

The rotation means (7) are fixed to the first door panel (83) and are suitable for cooperating with the first sliding means (6) to make the door panels (8) rotate relative to the walls of the cabinet.

The second sliding means (9) are fixed to a lateral wall of the cabinet and to the rotation means (7) in order to make the door panels (8) slide in a direction (Z) that is parallel to the lateral wall of the cabinet and perpendicular to the sliding direction (S) of the second and third door panel (82, 81) when moved by the first sliding means.

The first sliding means (6) make the third door panel (81) slide relative to the second door panel (82) in such a way to make the third door panel (81) slide between an opening position (FIG. 13), wherein the third door panel (81) is disposed on the second door panel (82) in such a way to provide access to a portion of the compartment of the cabinet, and a closing position (FIG. 11), wherein the third door panel (81) is coplanar to the second door panel (82) in such a way to cover the front opening that provides access to the compartment of the cabinet.

The first sliding means (6) make the second and third door panel (82, 81) slide automatically relative to the first door panel (83), in such a way that the second and third door panel (82, 81) can slide between an opening position (FIG. 17), wherein the second and third door panel (82, 81) are disposed on the first door panel (83) in such a way to provide access to a portion of the compartment of the cabinet, and a closing position (FIG. 13), wherein the second door panel (82) is coplanar to the first door panel (83) and the third door panel (81) is on the second door panel (82) in such a way to partially cover the front opening that provides access to the compartment of the cabinet.

Figure 3:
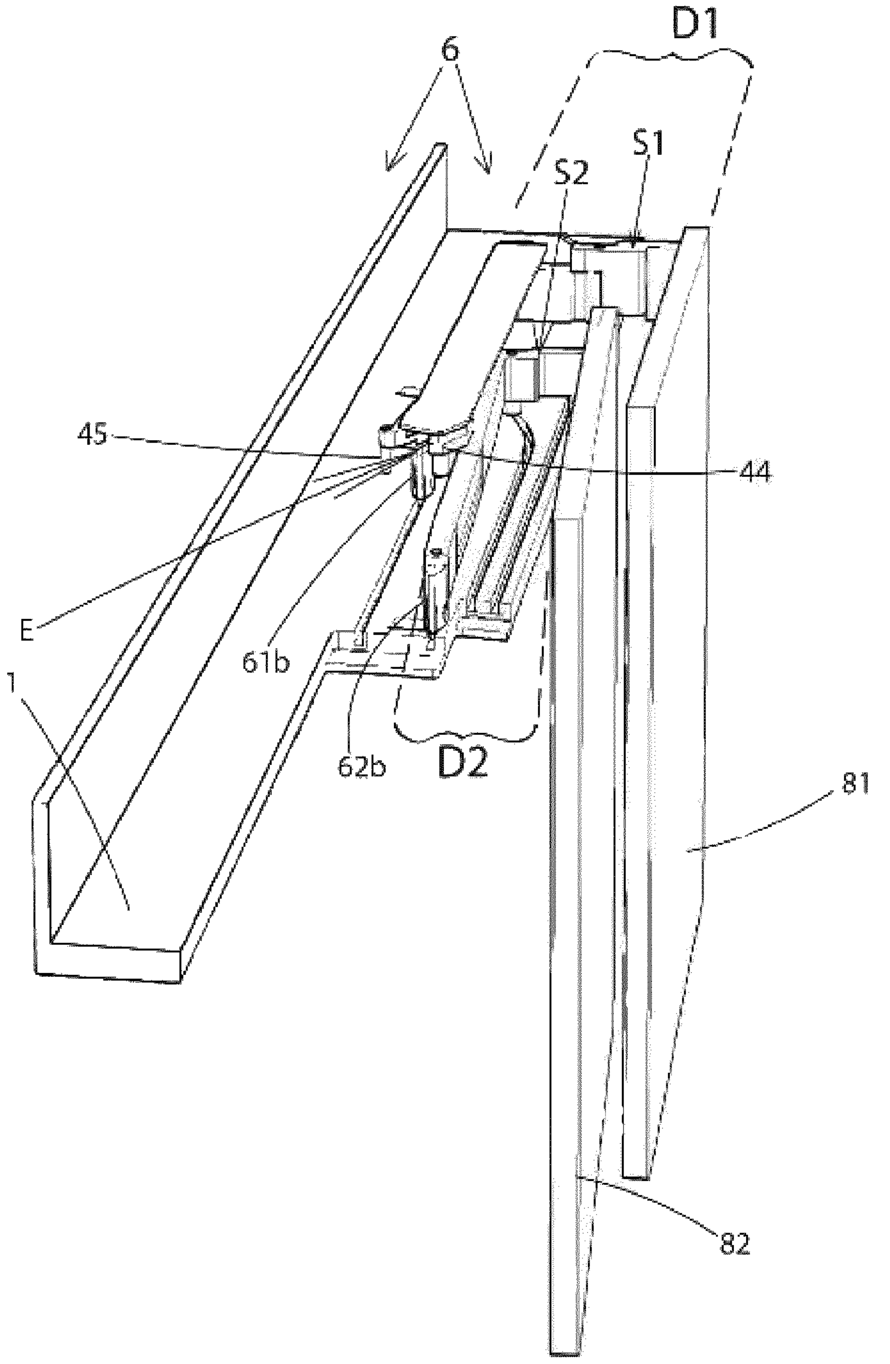
FIG. 3 is a perspective view of a portion of the cabinet according to the invention.
Figure 4:
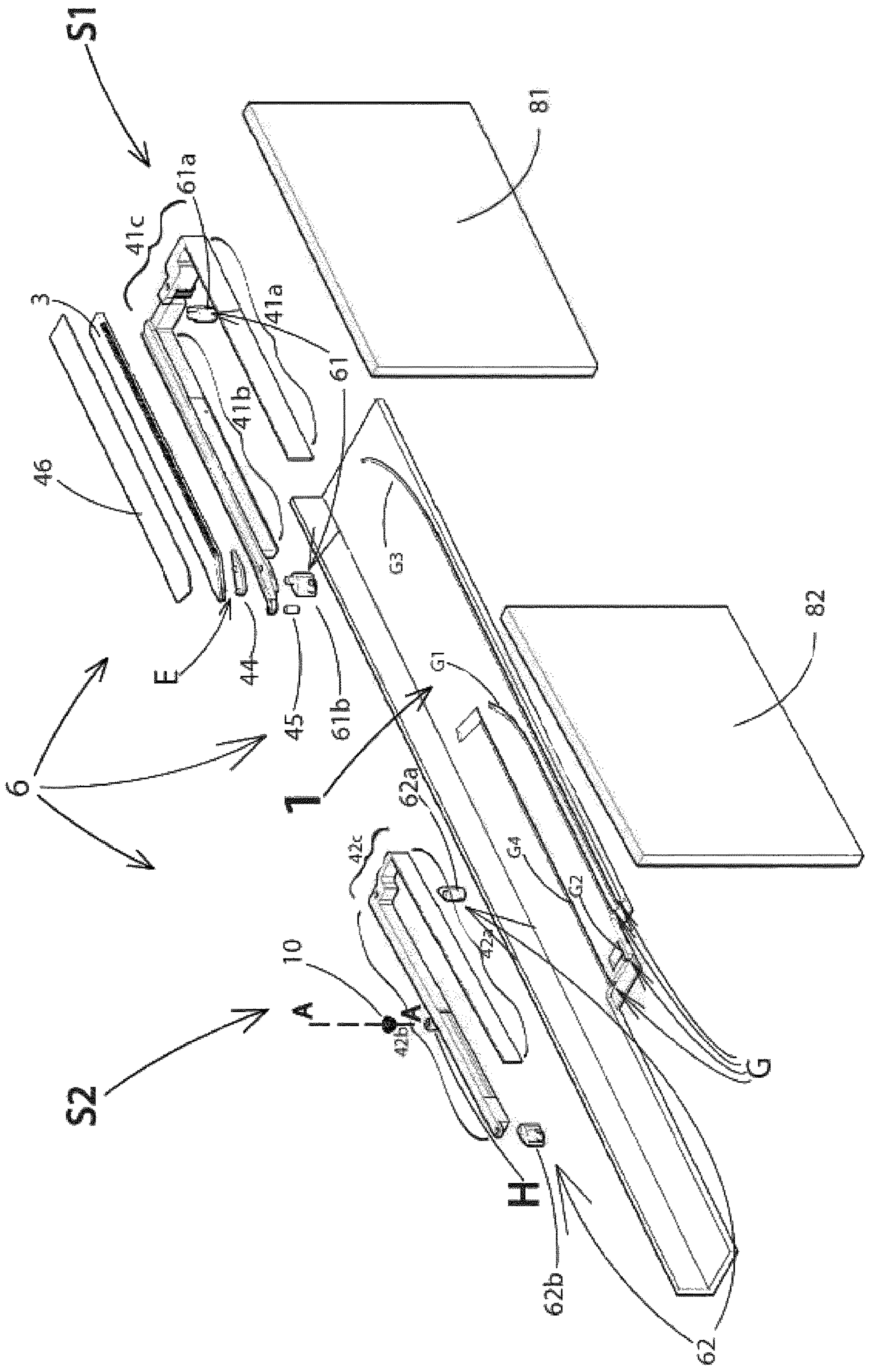
FIG. 4 is an axonometric exploded view of a portion of the cabinet according to the invention.
Figure 5:
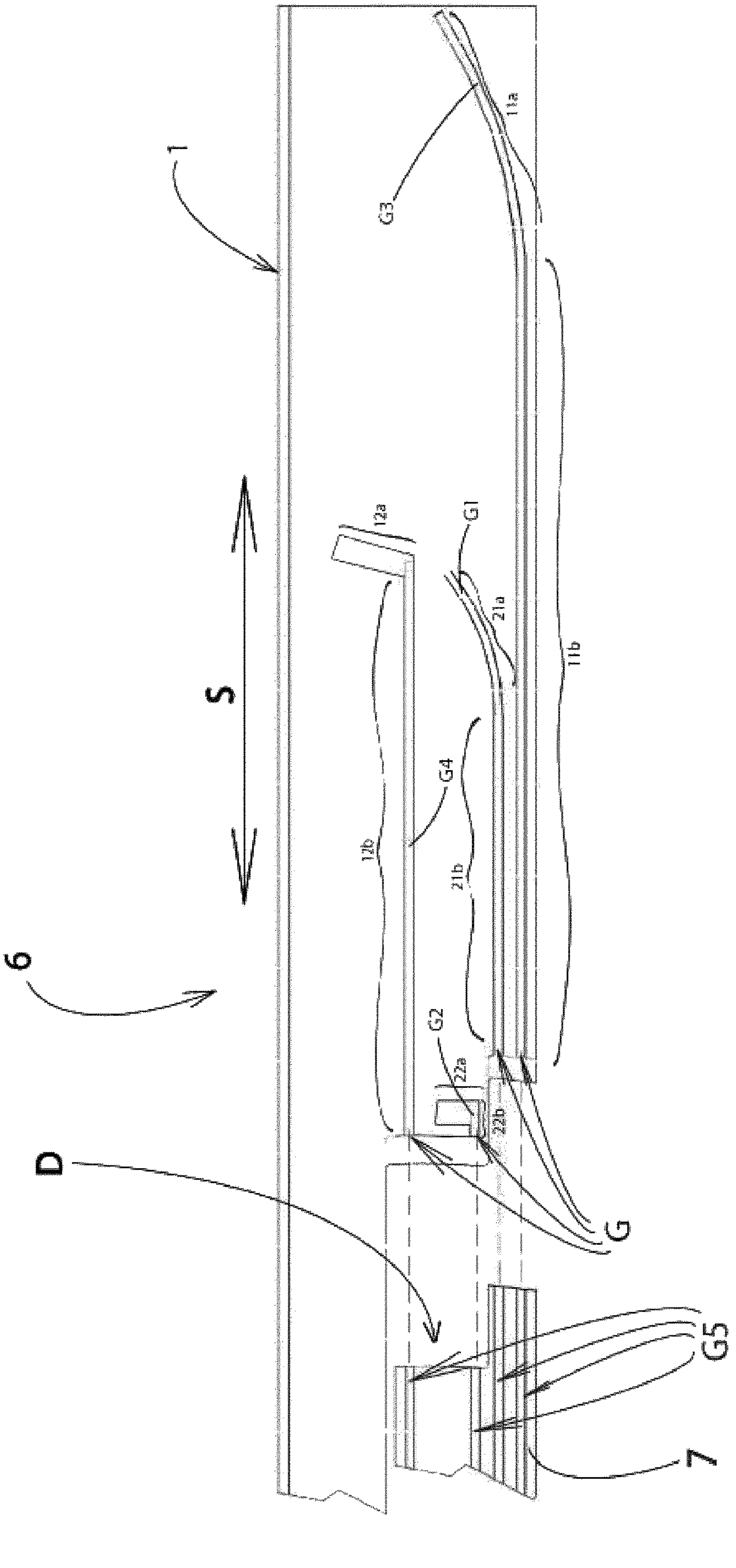
FIG. 5 is a top view of an upper portion of the cabinet according to the invention.
Figure 6:
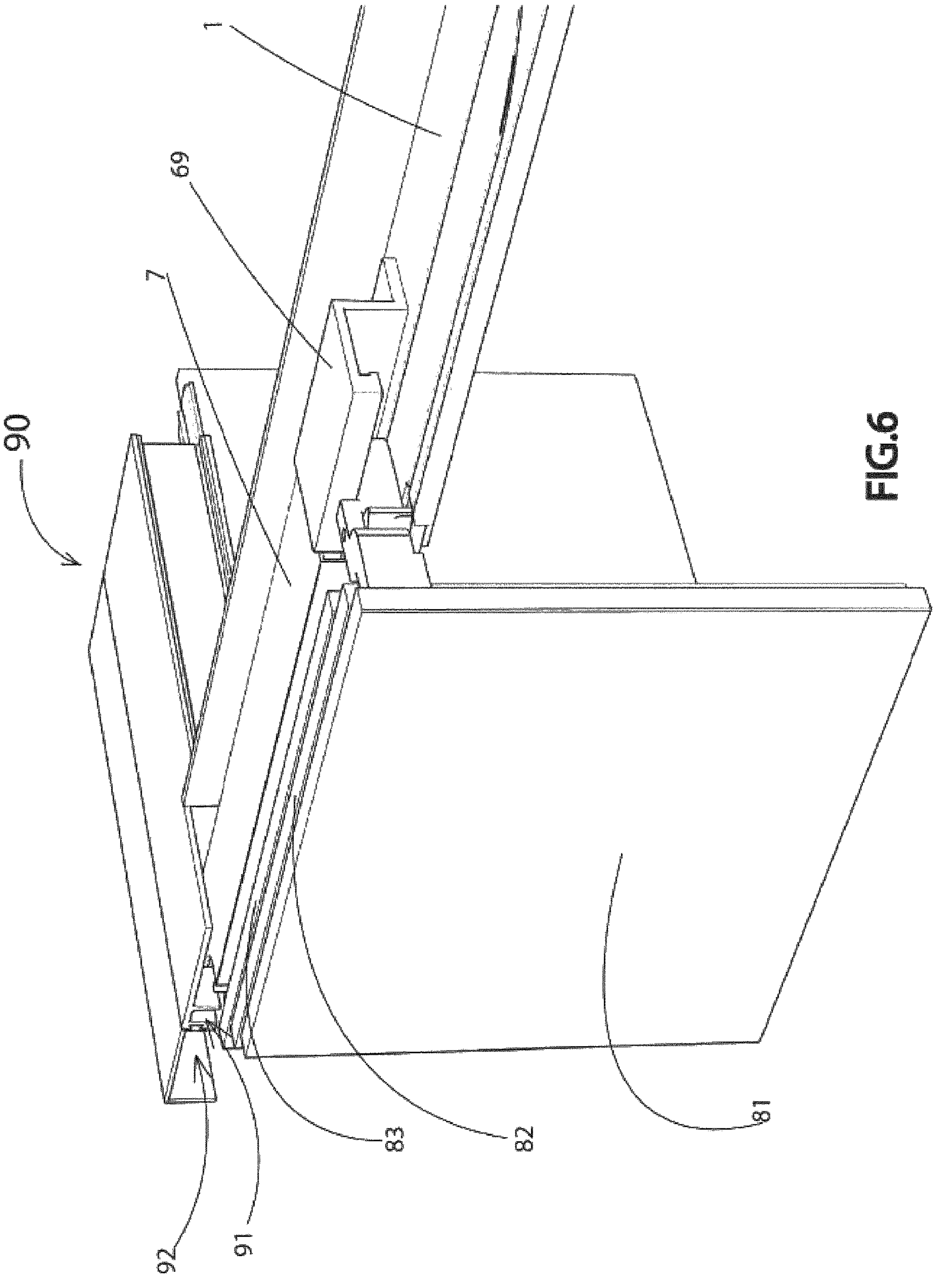
FIG. 6 is an axonometric view of the cabinet according to the invention, with the door panels in partially open position.

With reference to FIGS. 3 to 5, the first sliding means (6) comprise a first bracket (S2) fixed to the second door panel (82) and a second bracket (S1) fixed to the third door panel (81).

Each bracket (S1, S2) has a C-shape comprising a first arm (41*a*, 42*a*) fixed to the corresponding sliding door panel, a second arm (41*b*, 42*b*) parallel to the first arm (41*a*, 42*a*) and a connection arm (41*c*, 42*c*) perpendicular to the first and second arm.

The distance (D1) between the first arm and the second arm (41*a*, 41*b*) of the second bracket is higher than the distance (D2) between the first and the second arm (42*a*, 42*b*) of the first bracket, in such a way that the first bracket (S2) can be disposed inside the second bracket (S1).

Sliders (61, 62) are fixed to the brackets (S1, S2) and slidingly mounted on fixed slides (G). Consequently, the sliders (61, 62) are indirectly fixed to the door panels (82, 81). The slides (G) are obtained in a plate (1) fixed to the upper panel (P1) and to the lower panel (P2) of the cabinet in correspondence of the front opening.

The sliders (62) of the first bracket (S2) comprise a first slider (62*a*) fixed to the connection arm (42*c*) of the first bracket and a second slider (62*b*) fixed to the second arm (42*b*) of the first bracket.

The slides (G) of the plate (1) comprise a first slide (G1) where the first slider (62*a*) of the first bracket slides, and a second slide (G2) where the second slider (62*b*) of the first bracket slides.

The sliders (61) of the second bracket (S1) comprise a first slider (61*a*) fixed to the connection arm (41*c*) of the second bracket and a second slider (61*b*) fixed to the second arm (41*b*) of the second bracket.

The slides (G) of the plate (1) comprise a third slide (G3) where the first slider (61*a*) of the second bracket slides, and a fourth slide (G4) where the second slider (61*b*) of the second bracket slides.

The slides (G) comprise an end section that is inclined relative to a sliding direction (S) of the second door panel (82) when moved by the first sliding means, in such a way that, when the second and third door panels (82, 81) are opened, said door panels (82, 81) are automatically pushed outwards. In particular, the inclined end section (21*a*, 11*a*) of the first and third slide (G1, G3) is curvilinear with convexity towards the door panels. The inclined end section (22*a*, 12*a*) of the second and fourth slide (G2, G4) is rectilinear.

The slides (G) comprise a main rectilinear section (21*b*, 11*b*, 22*b*, 12*b*) that is parallel to the sliding direction (S) and ends on one edge of the plate (1).

With reference to FIGS. 4, 16, 18 and 19, the first sliding means (6) comprise synchronization means (C) fixed to the second and the third door panel (82, 81) to synchronize the sliding of the second and third door panel (82, 81) towards the first door panel (83).

The synchronization means (C) comprise a sprocket (10) that is revolvingly mounted in a cylindrical housing (H) obtained on the second arm (42*b*) of the first bracket (S2) in such a way to rotate around a vertical axis of rotation (A-A). The sprocket (10) protrudes in upper position relative to the first bracket (S2).

The synchronization means (C) also comprise:

a first horizontal rack (3) disposed on the second arm (41*b*) of the second bracket (S1); and a second fixed rack (18) fixed in horizontal position to the upper wall of the cabinet.

The sprocket (10) is suitable for engaging with said racks (3, 18).

The second rack (18) is obtained inside a bracket (69). The bracket (69) comprises:

a base wall (69*a*) fixed to the upper wall of the cabinet;

a first lateral wall (69*b*) that protrudes vertically upwards;

an upper horizontal wall (69*c*) disposed above the plate (1); and a second lateral wall (69*d*) parallel to the first lateral wall (69*b*).

The length of the second lateral wall (69*d*) is lower than the length of the first lateral wall (69*b*), in such a way to generate a front opening (69*e*).

Moreover, the bracket (69) is provided with two lateral openings (69*f*).

The second rack (18) is fixed to the second lateral wall (69*d*) of the bracket (69) and extends inside the bracket (69) between the two lateral openings (69*f*).

During the opening of the second door panel (82) and of the third door panel (81), the first rack (3) slides inside the bracket (69), in such a way that the first rack (3) and the second rack (18) are disposed in opposite parallel position.

Figure 16:
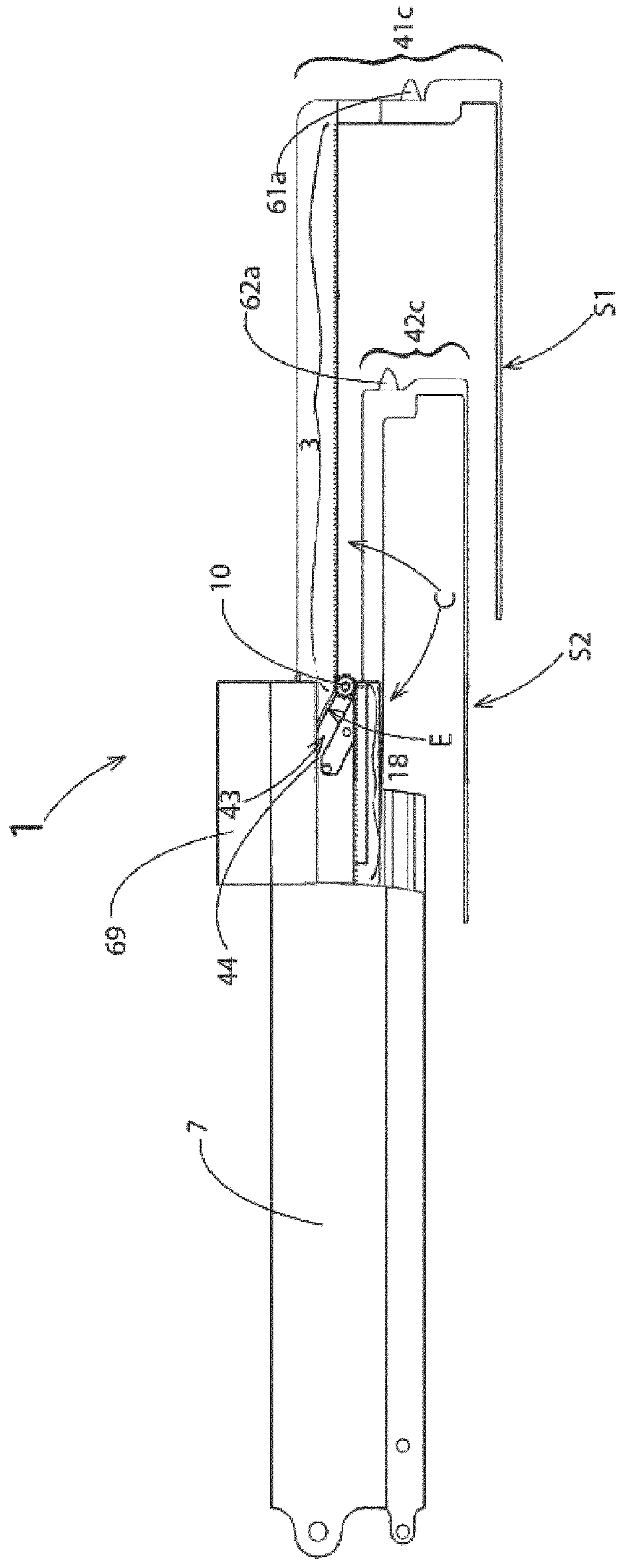
Figure 18:
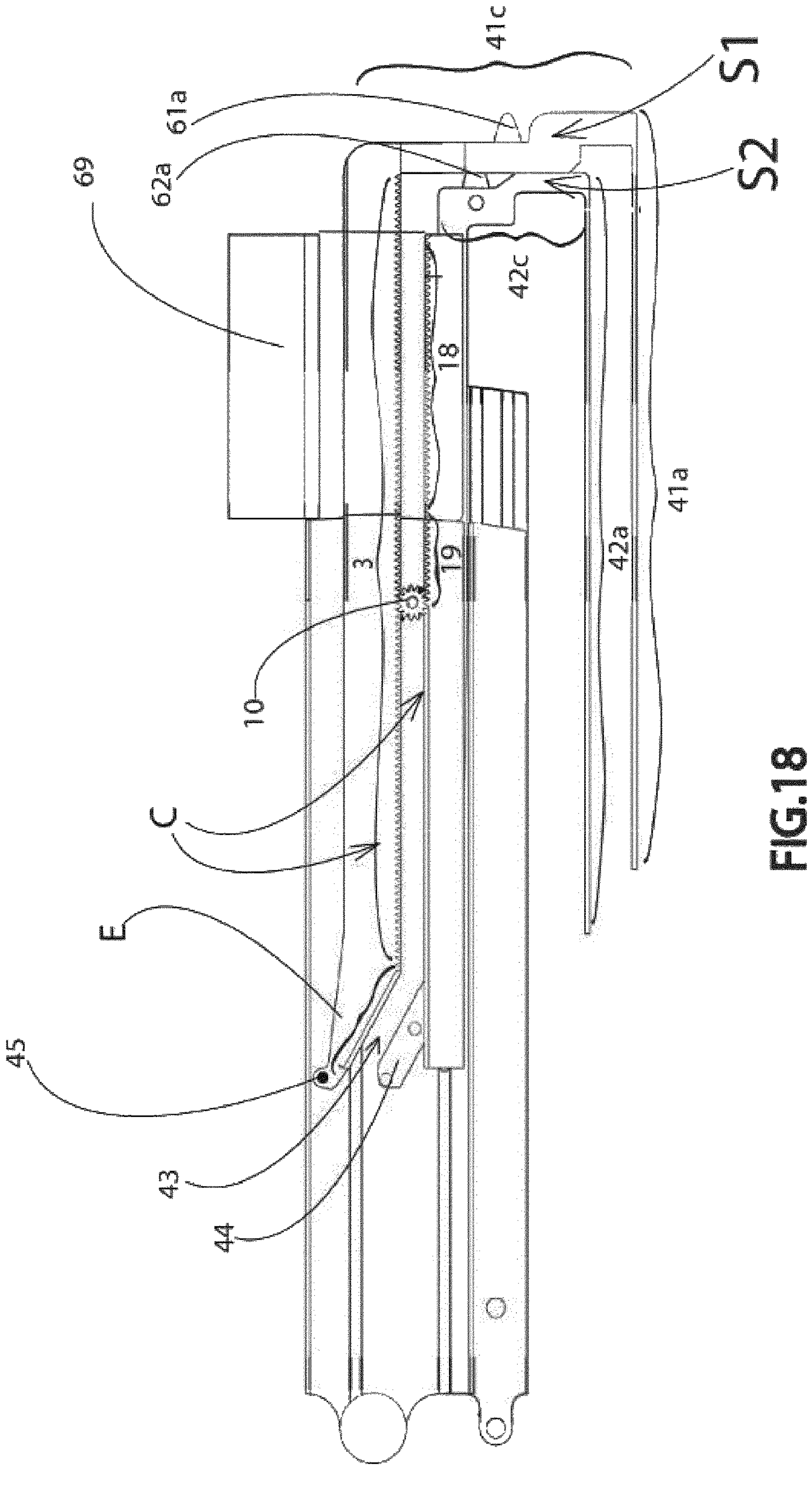
Figure 19:
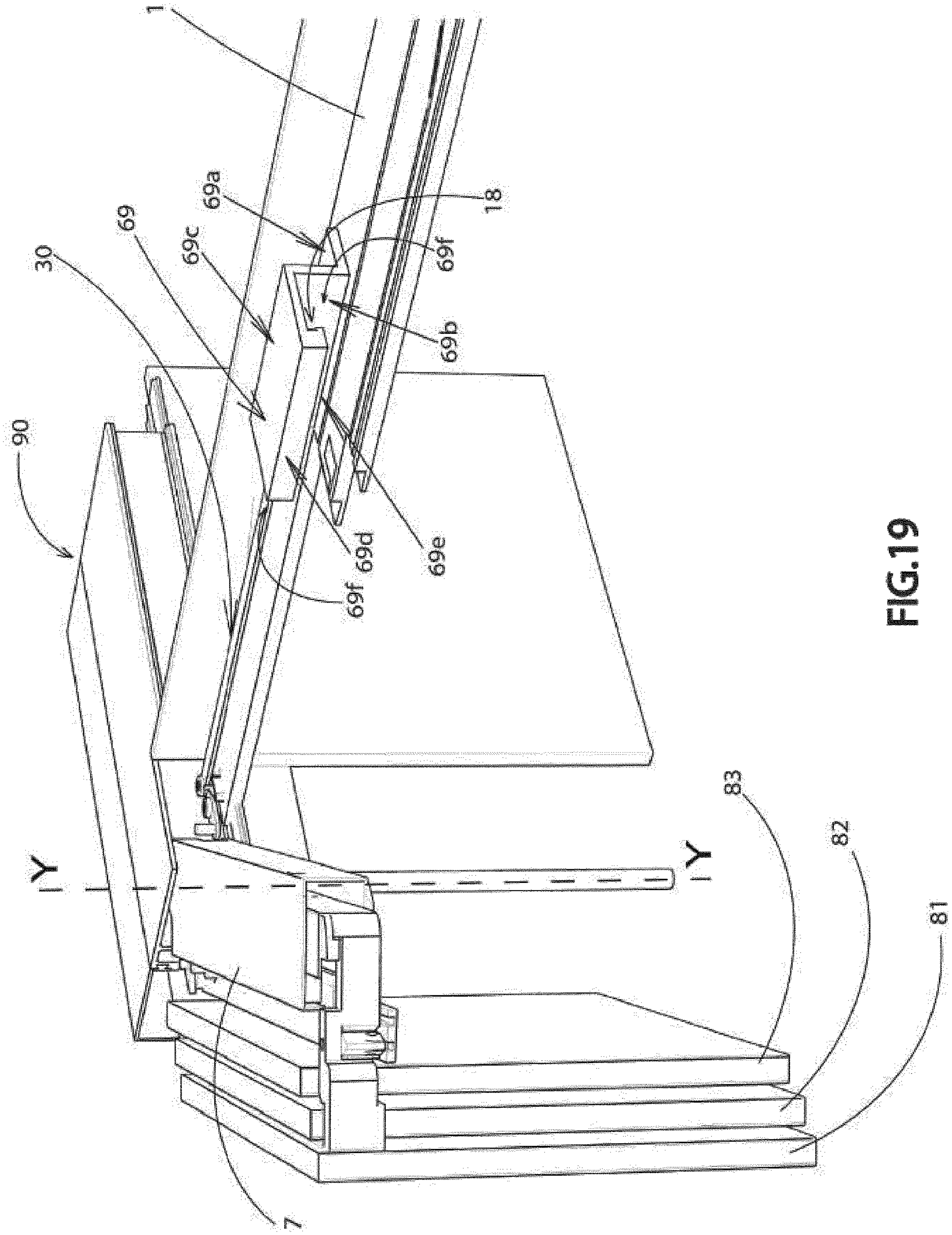
FIG. 19 is a diagrammatic axonometric view of a portion of the cabinet that illustrates the door panels during opening.

With reference to FIGS. 4, 16 and 18, the second bracket (S1) comprises a diverter (44) fixed to the second arm (41*b*) by means of a supporting plate (46). The second arm (41*b*) of the second bracket has a free end (E) that is inclined relative to the sliding direction (S) of the second door panel (82) when moved by the first sliding means and the diverter (44) comprises a wall that is inclined relative to the sliding direction (S) of the second door panel (82) when moved by the first sliding means. The inclined wall of the diverter (44) is directed towards the free end (E) of the second arm (41*b*) of the second bracket. A gap (43) is provided between the free end (E) of the second arm (41*b*) of the second bracket and the inclined wall of the diverter (44), said gap (43) being inclined relative to the sliding direction (S) of the second door panel (82) when moved by the first sliding means for the passage of the sprocket (10).

Figure 11:
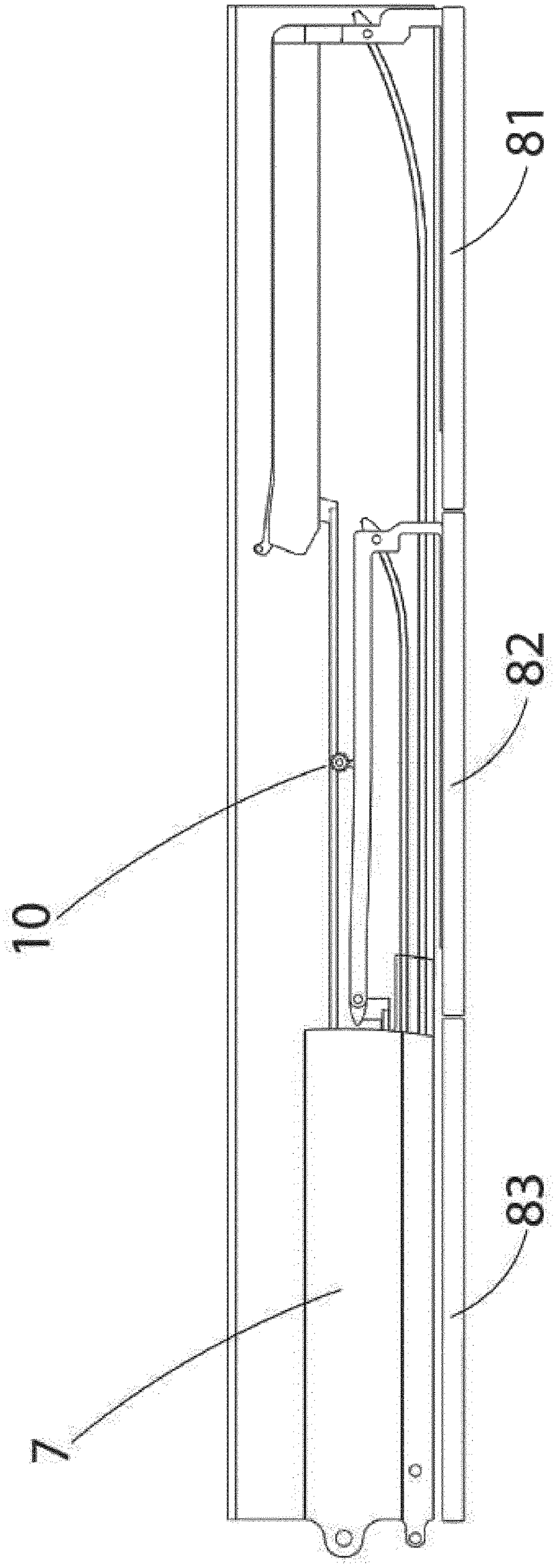
FIGS. 11 to 18 are diagrammatic top views that illustrate the openings steps of the door panels.
Figure 12:
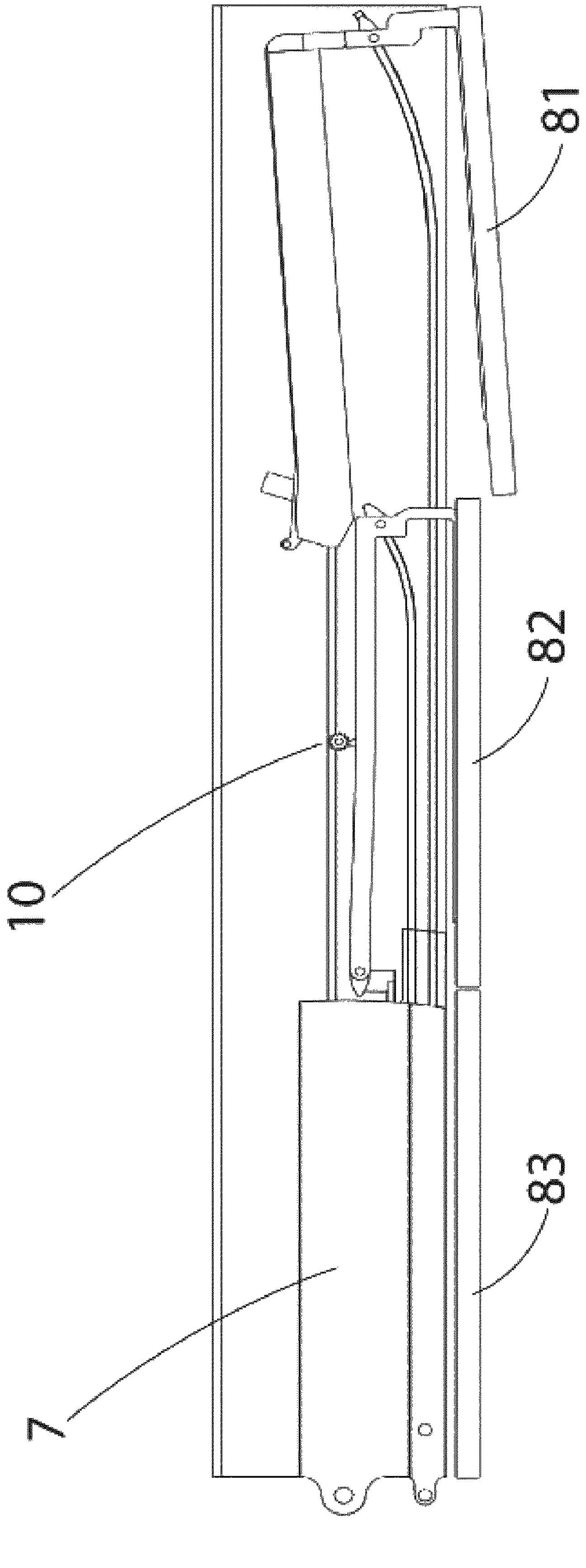
Figure 13:
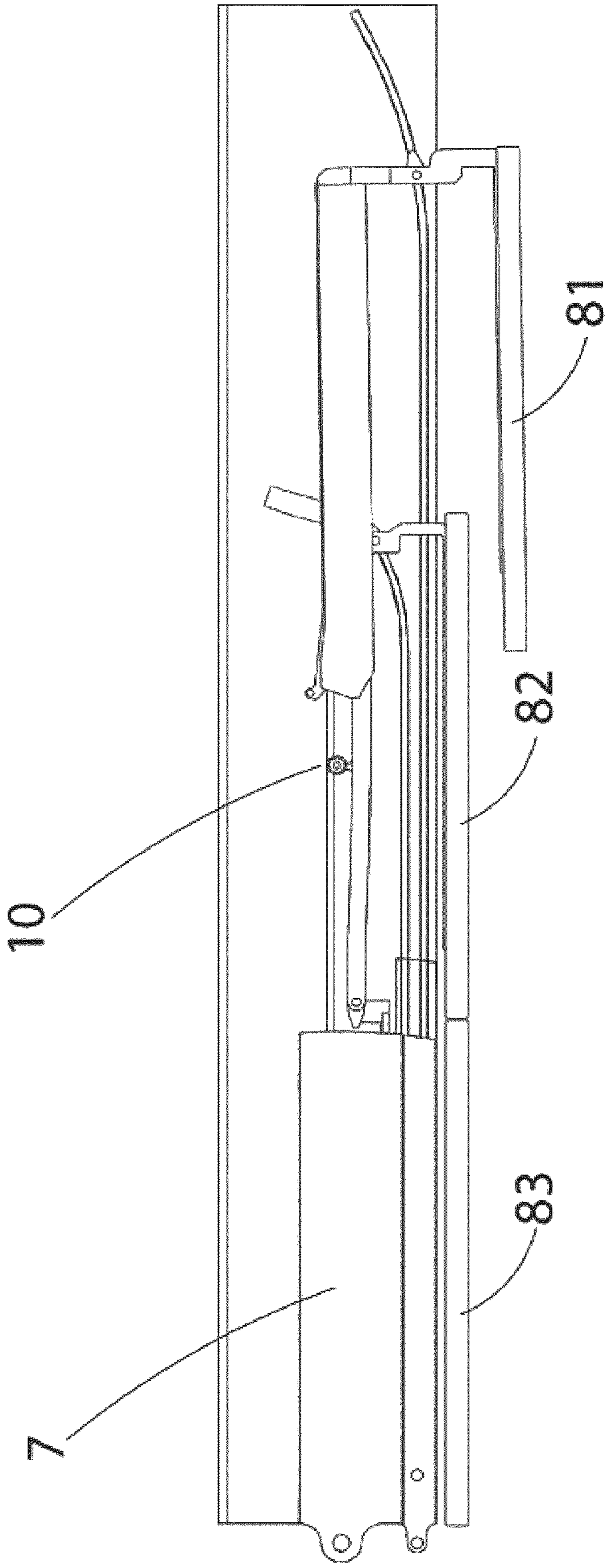

With reference to FIGS. 11 to 13, by pushing the third door panel (81) from the closing position to the opening position, the sliders (61) of the second bracket slide on the inclined end section of the third and fourth slide (G3, G4), pushing the third door panel (81) outwards and making the third door panel (81) slide towards the second door panel. When sliding, the third door panel (81) is disposed in external position relative to the second door panel (82) and in overlapped position relative to the second door panel. The second bracket (S1) is disposed in external position relative to the first bracket (S2).

Figure 14:
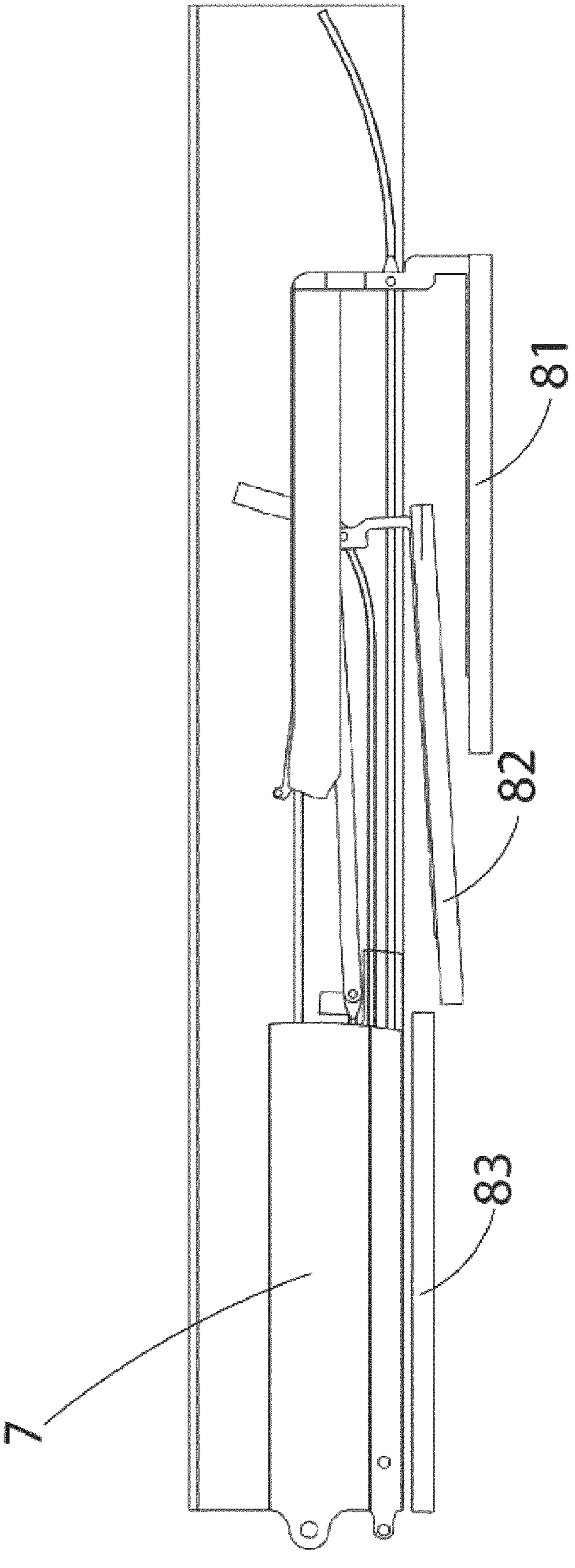
Figure 15:
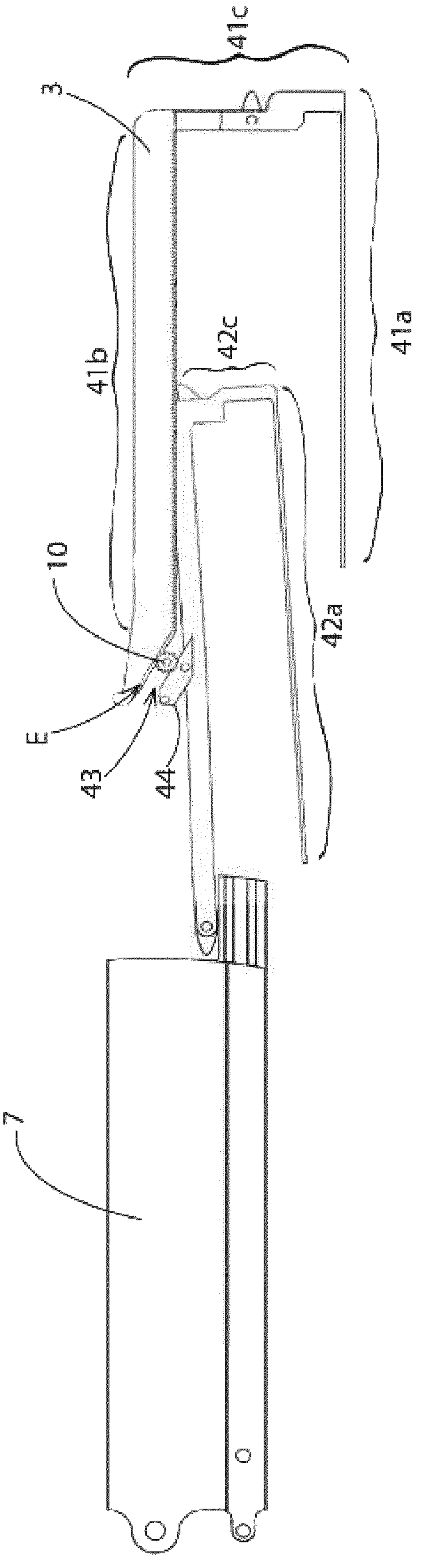

With reference to FIGS. 14 to 16, when the second arm (41*b*) of the second bracket (S1) intercepts the sprocket (10), the sprocket (10) is inserted in the inclined gap (43), moving the first bracket (S2) that is integral with the second door panel (82). The slides (62) of the first bracket (S2) slide on the first and second slide (G1, G2), pushing the second door panel (82) outwards and making the second door panel (82) and the third door panel (81) slide towards the first door panel (83). The second arm of the second bracket (S1) is inserted in the bracket (69). The other arms (41*a*, 42*a*, 42*b*) slide outside the bracket (69). The first rack (3) is disposed in opposite position to the second rack (18), in such a way that the sprocket (10) can engage with the first rack (3) and with the second rack (18), causing the synchronous movement of the second and third door panel (82, 81) towards the first door panel (83).

When sliding, the second door panel (82) is disposed in external position relative to the first door panel (83) and in overlapped position relative to the first door panel. Consequently, also the third door panel (81) is overlapped to the first door panel (83).

Evidently, because of the synchronization means (C), a single push can generate the opening of the second door panel and of the third door panel.

Figure 7:
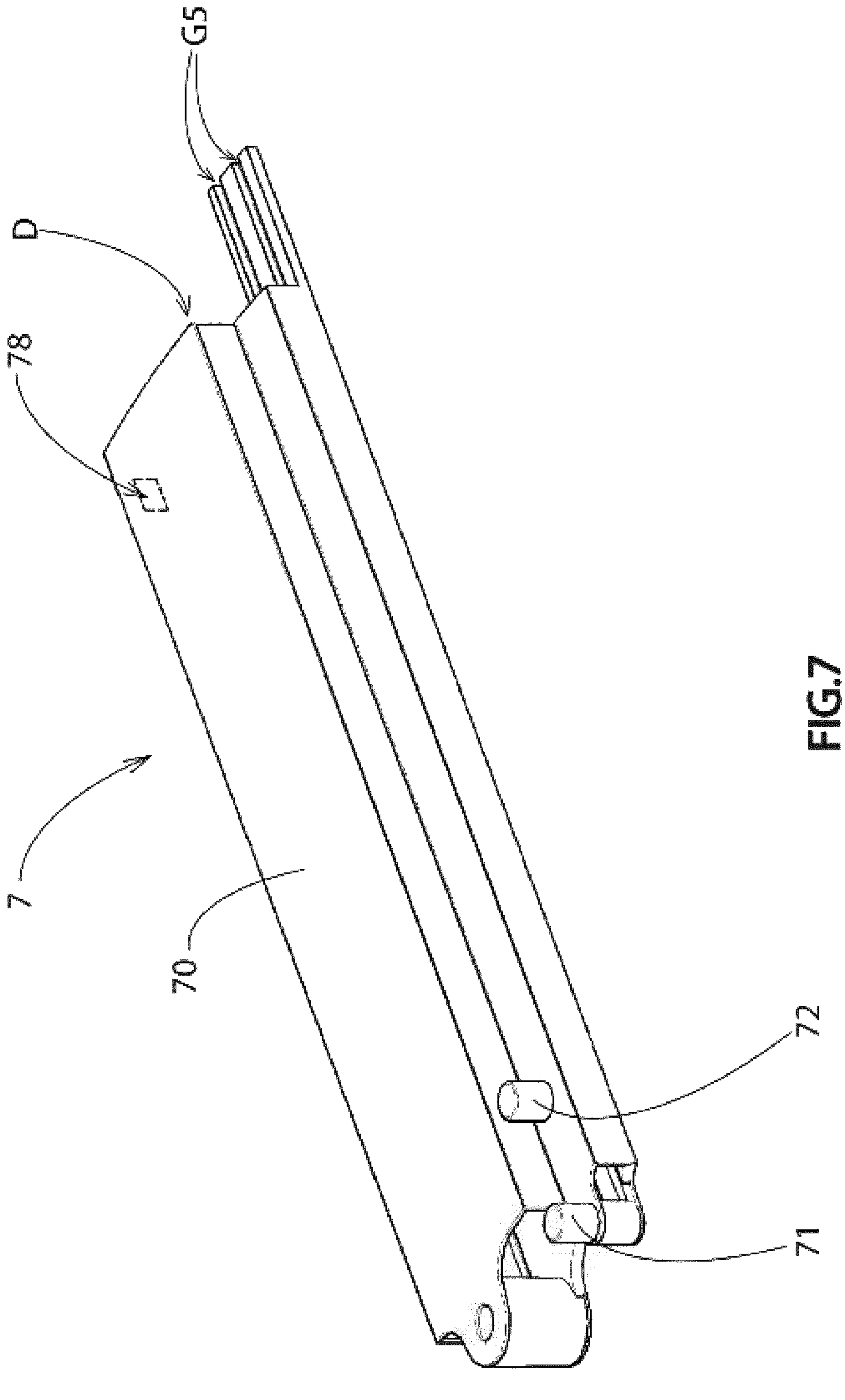
FIG. 7 is an axonometric view of a revolving frame of the cabinet according to the invention.

With reference to FIGS. 1, 2 and 7, the rotation means (7) of each supporting frame comprise a mobile frame (70) provided with a tubular shape in such a way to define a housing (D). The mobile frame (70) is disposed above and under the first door panel (83) and is fixed to the first door panel (83). The mobile frame (70) is suitable for housing the first bracket (S2) and the second bracket (S1) when the second and the third door panel (82, 81) are in opening position.

The mobile frame (70) is revolvingly fixed to the second translation means (9) by means of a vertical pin (R) with an axis (Y-Y) (FIG. 19), in such a way to make the door panels (8) rotate between an opened position (FIG. 20), wherein the door panels (8) are rotated outwards, preferably by 90°, in such a way to provide access to the compartment of the cabinet, and a closed position (FIG. 17), wherein the first door panel (83) partially covers the front opening that provides access to the compartment of the cabinet.

The mobile frame (70) comprises an opening in communication with the lateral opening (69*f*) of the bracket (69), when the first door panel (83) is in closed position.

The mobile frame (70) comprises rectilinear slides (G5) where the slides (62, 61) of the first and second bracket (S2, S1) slide.

The slides (G5) of the mobile frame (70) comprise four slides, each slide (G5) of the mobile frame (70) being the continuation of one of the slides (G) obtained on the plate (1).

Figure 17:
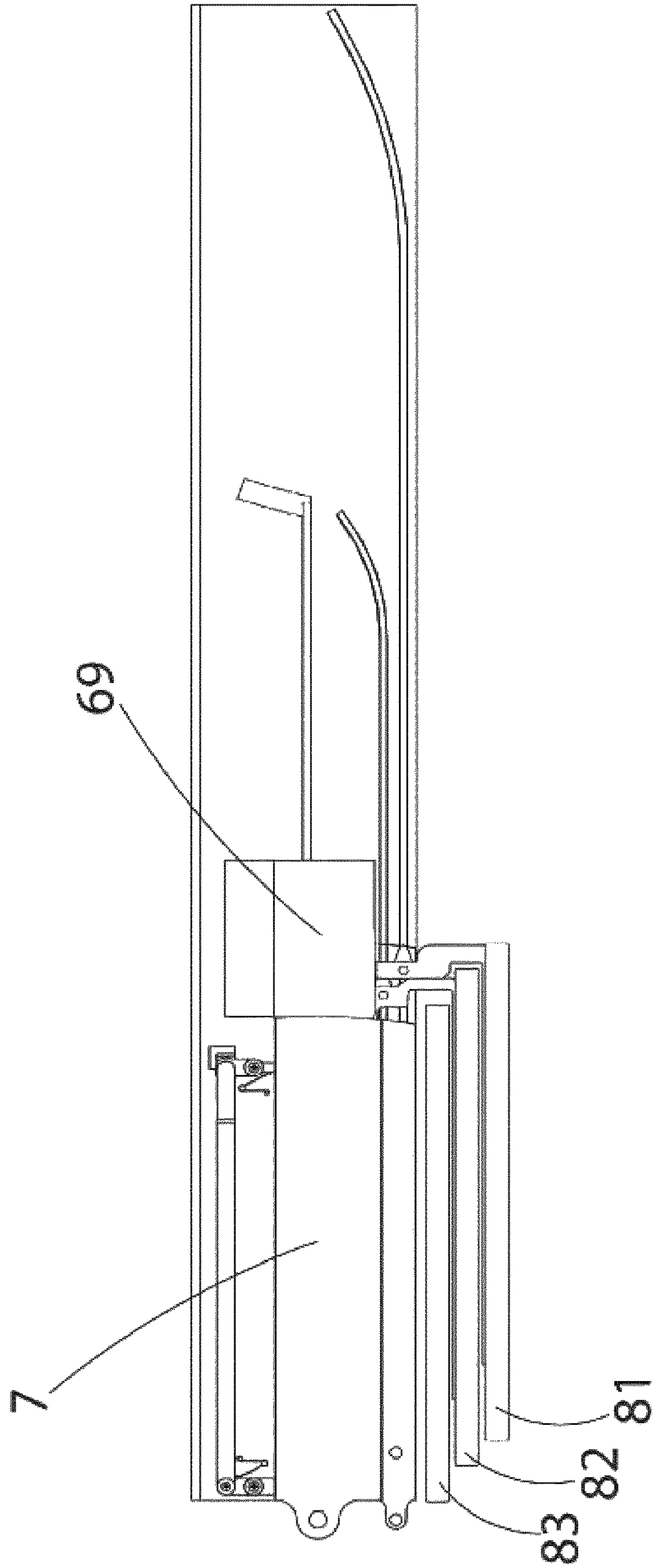

As shown in FIG. 17, when the second and third door panel (82, 81) slide towards the first door panel (83), the brackets (S2, S1) of the second and third door panel slide on the slides (G) of the plate (1) and then on the slides (G5) of the mobile frame, in such a way that the second arms (41*b*, 42*b*) of the brackets (S1, S2) are disposed in the housing (D) of the mobile frame (70), in such a way to integrally rotate with the first door panel (83).

With reference to FIG. 18, the mobile frame (70) comprises a rack (19) disposed in horizontal position inside the housing (D). The rack (19) is continuous and aligned with the second rack (18) of the synchronization means when the first door panel (83) is closed. When the second and third door panel (82, 81) slide towards the first door panel (83), the sprocket (10) of the synchronization means engages with the second rack (18) of the synchronization means and with the rack (19) of the mobile frame.

Figure 8:
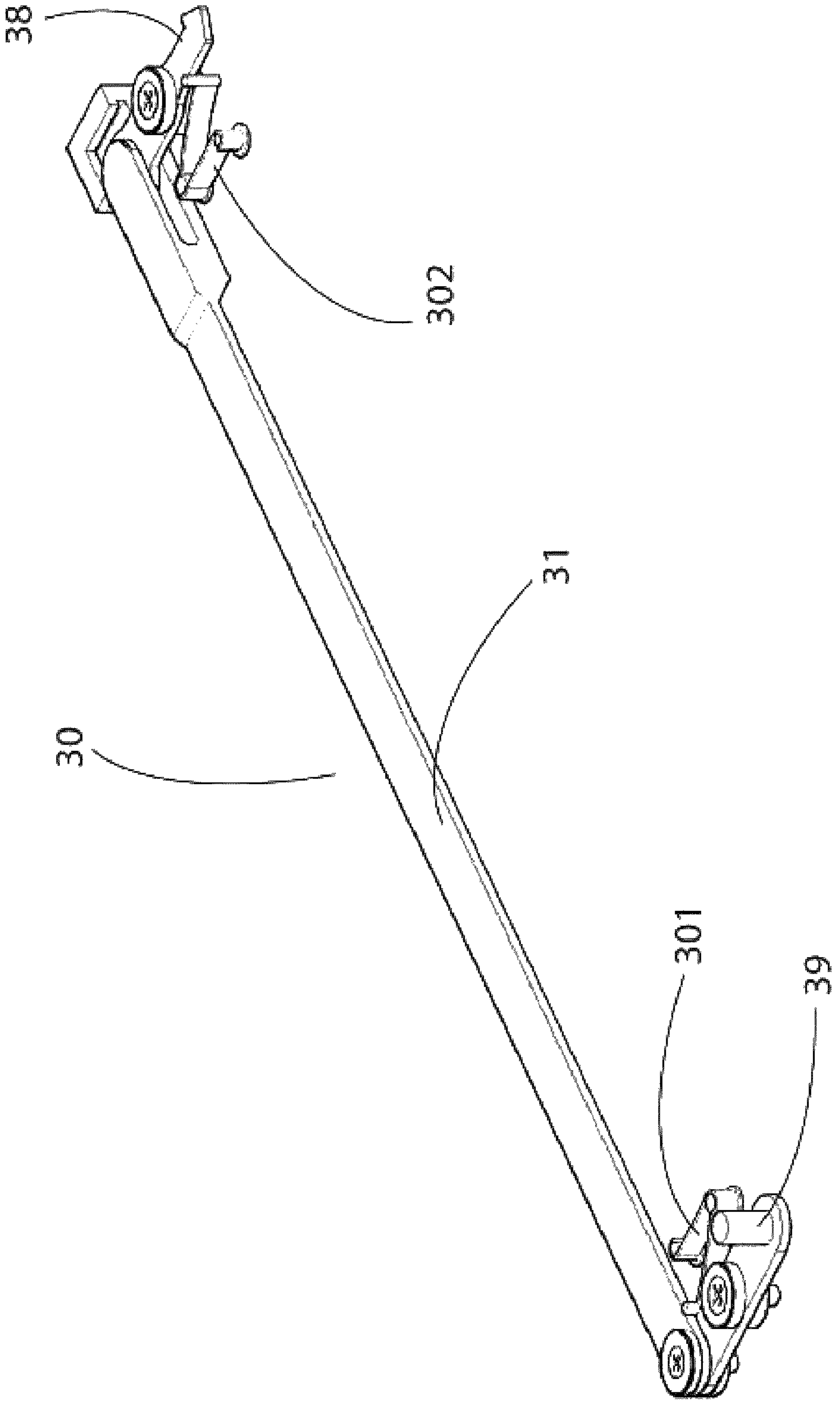
FIG. 8 is an axonometric view of locking/unlocking means of the cabinet according to the invention.
Figure 9:
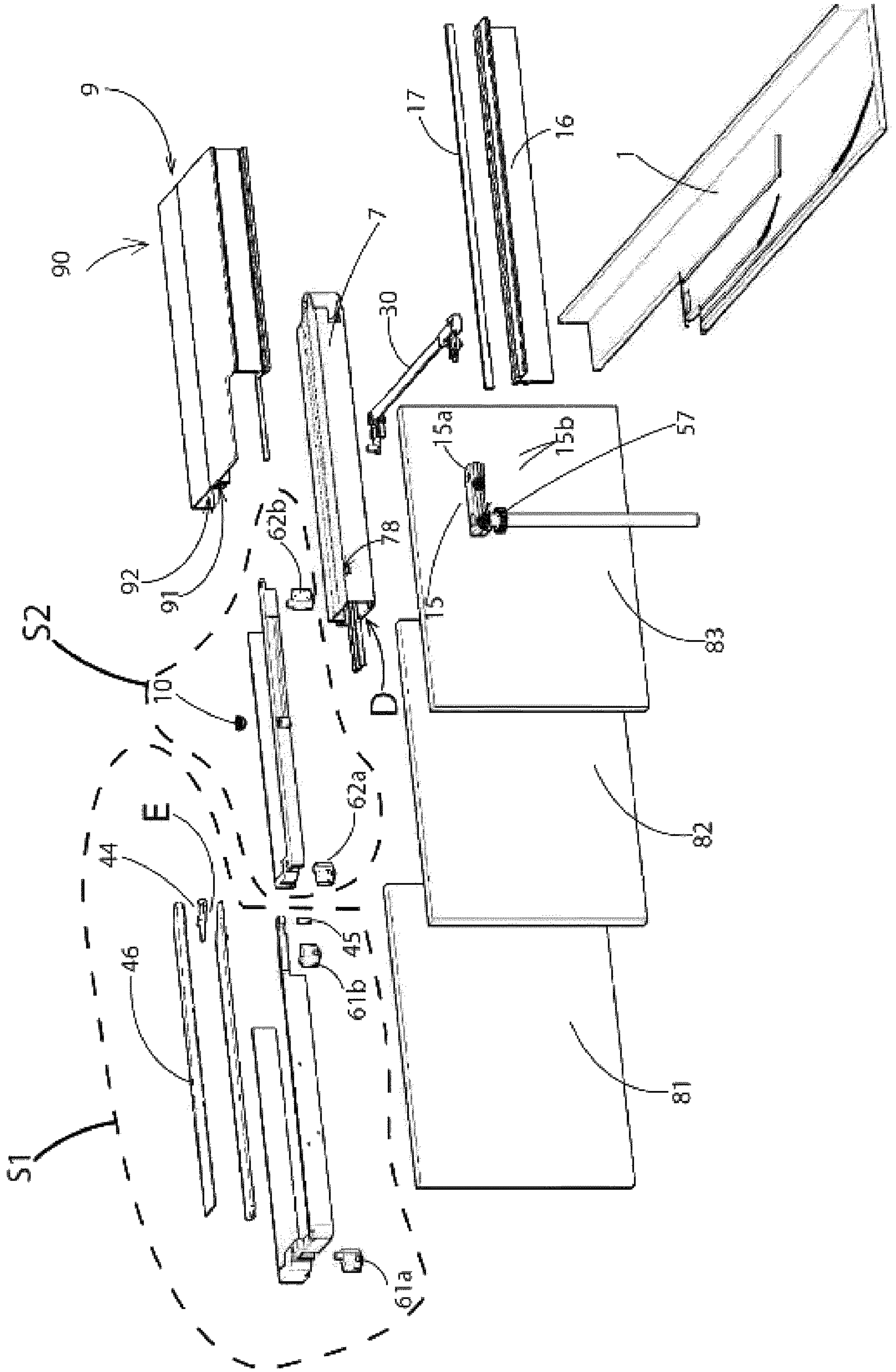
FIG. 9 is an axonometric exploded rear view of a portion of the cabinet according to the invention, with the door panels in open position.
Figure 10:
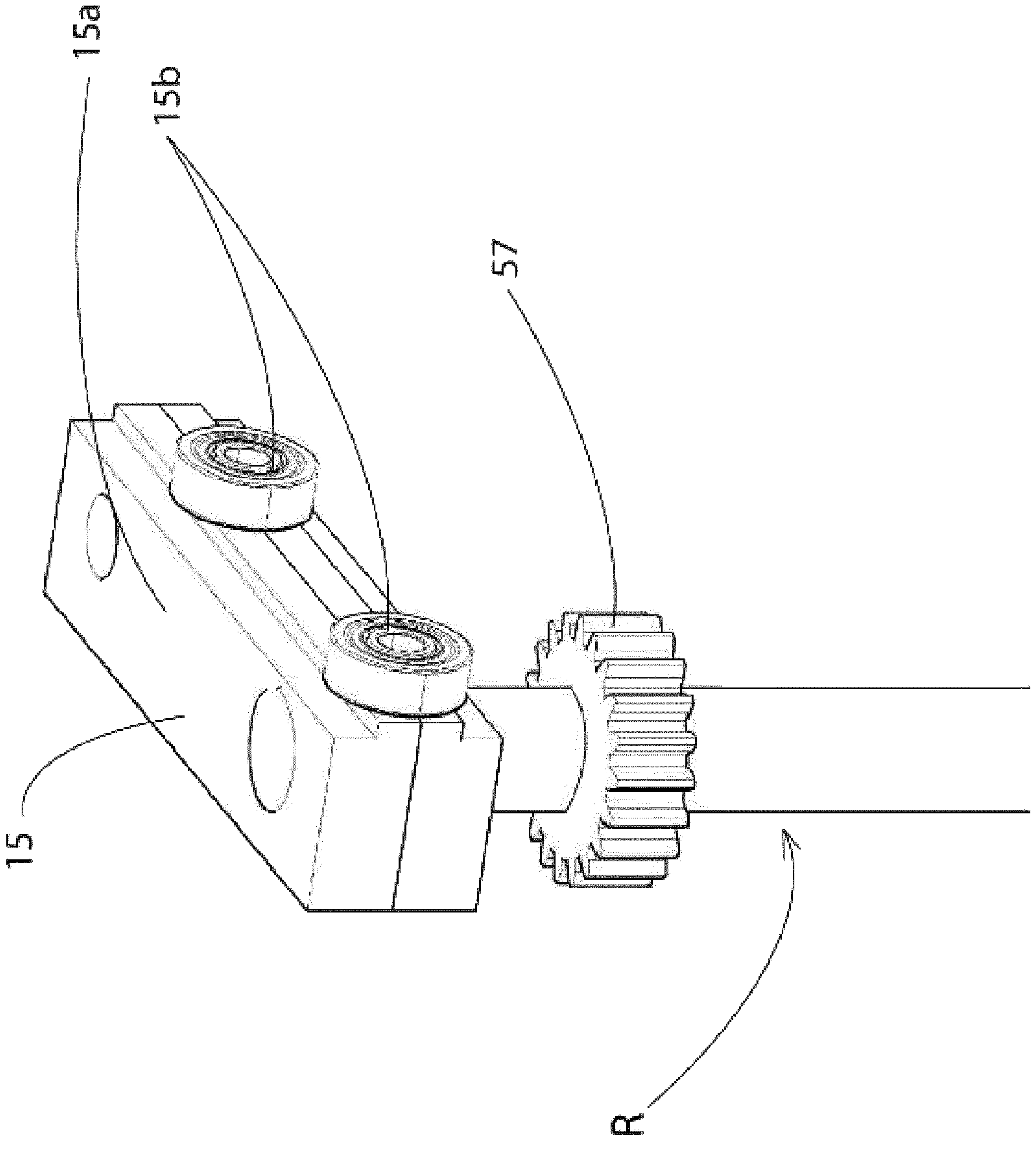
FIG. 10 is an axonometric view of a portion of synchronization means of the cabinet according to the invention.

With reference to FIGS. 2 and 8, the rotation means (7) comprise locking/unlocking means (30) that are integral with a wall of the cabinet and suitable for cooperating with the mobile frame (70), in such a way to lock/unlock the rotation of the mobile frame (70).

The locking/unlocking means (30) comprise:

an activation element (39) comprising a pin, which is suitable for hitting a pin (45) (FIG. 4) that is integral with the second arm (41*b*) of the second bracket of the first sliding means to move the locking/unlocking means (30);

a locking element (38) comprising a tooth suitable for being inserted in a hole (78) (FIG. 7) obtained on the mobile frame;

a driving element (31) comprising a rod that is fixed to the pin of the driving element at one end by means of a lever mechanism and to the tooth of the locking element at the other end;

a first spring (301) disposed in correspondence of the pin of the activation element (39), and a second spring (302) disposed in correspondence of the tooth of the locking element.

With reference to FIG. 18, when the second and third door panel (82, 81) reach the open position, the second arms (41*b*, 42*b*) of the brackets are disposed in the housing (D) of the mobile frame.

The pin (45) integral with the second arm (41*b*) of the second bracket of the first translation means hits the pin (39) of the activation element (31). Such an impact causes a movement of the activation element (31). By means of the driving element (31), said movement is transmitted to the tooth of the locking element (38) inserted in the hole (78) of the mobile frame (70). The tooth of the locking element (38) comes out of the hole (78) of the mobile frame (70), unlocking the rotation of the mobile frame.

The door panels (8) can be rotated outwards by 90° (FIGS. 19 and 20) around the axis (Y-Y) of the pin (R) of the rotation means, in such a way that the door panels (8) do not cover the front opening that provides access to the compartment of the cabinet.

The springs (301, 302) of the locking/unlocking means bring the tooth of the locking element (38) back inside the hole (78) of the mobile frame when the door panels are rotated in closed position.

With reference to FIGS. 1, 2, 9 and 10, the second sliding means (9) of each supporting frame are fixed to the mobile frame (70) of the rotation means in such a way to make all the door panels (8) slide along a direction (Z) (FIG. 20) that is parallel to a lateral wall of the cabinet, in such a way that the door panels slide between an extracted position, wherein the door panels protrude frontally from the walls of the cabinet, and a retracted position (see FIG. 22), wherein the door panels are completely disposed in adjacent position relative to a lateral wall of the cabinet, in such a way that the door panels do not cause a front hindrance.

The second sliding means (9) comprise a fixed slide (16) that is horizontally fixed in a lateral wall of the cabinet.

A slider (15) is suitable for sliding on the slide (16). The slider (15) has a parallelepiped shape and comprises two ball bearings (15*b*) that roll in the slide (16). The slider (15) is integral with the pin (R) of the rotation means (7) in such a way to make the door panels (8) slide in a direction (Z) that is perpendicular to the sliding direction (S) of the second door panel (82) when moved by the first sliding means.

The second sliding means (9) comprise a rack (17) that is integral with the lateral wall of the cabinet.

Said rack (17) engages with a sprocket (57) mounted on the pin (R) of the rotation means (7), in such a way to guide the sliding movement of the mobile frame (70) of the rotation means (7) along the sliding direction (Z) (see FIG. 20) that is perpendicular to the sliding direction (S) of the second and third door panel (82, 81) when moved by the first sliding means (6).

The second sliding means (9) comprise a fixed frame (90) fixed in the lateral wall of the cabinet in horizontal position. The fixed frame (90) is shaped as an overturned-U in such a way to define a sliding channel where the door panels (8) and the rotation means (7) slide.

The sliding channel of the fixed frame (90) is divided by means of partitions into:

a first channel (91) where two pegs (71, 72) (FIG. 7) of the mobile frame of the rotation means slide a second channel (92) where the door panels (8) slide.

During the rotation of the mobile frame, the pegs (71, 72) of the mobile frame are disposed inside the first channel (91) of the fixed frame, thus stopping the mobile frame (70) after a 90° rotation. The mobile frame (70) slides between the first channel (91) and the lateral wall of the cabinet.

Figure 20:
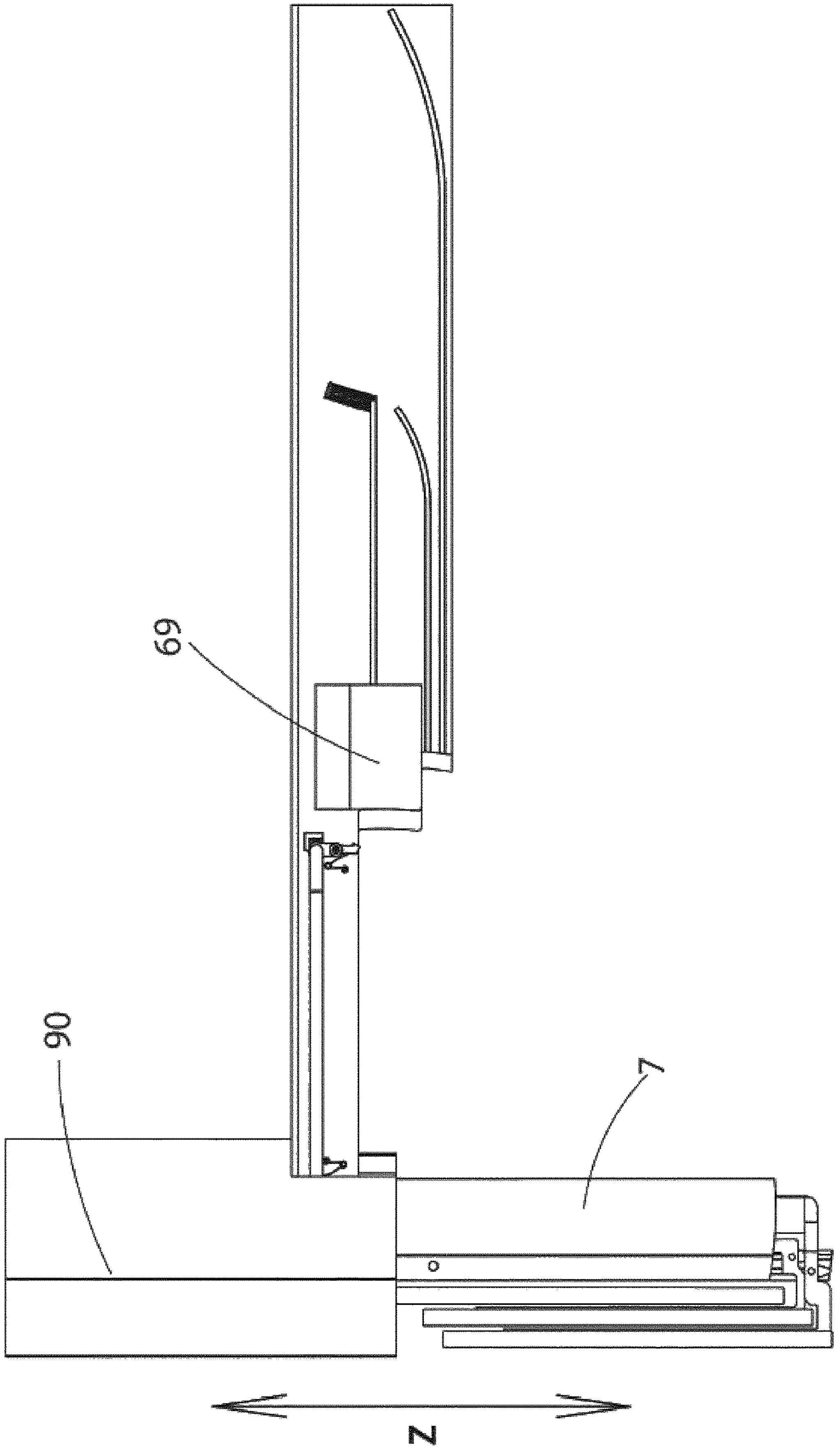
FIG. 20 is a diagrammatic top view of the cabinet according to the invention, which illustrates the opening step of the door panels with completed rotation, when the door panels assembly is not in retracted position.
Figure 21:
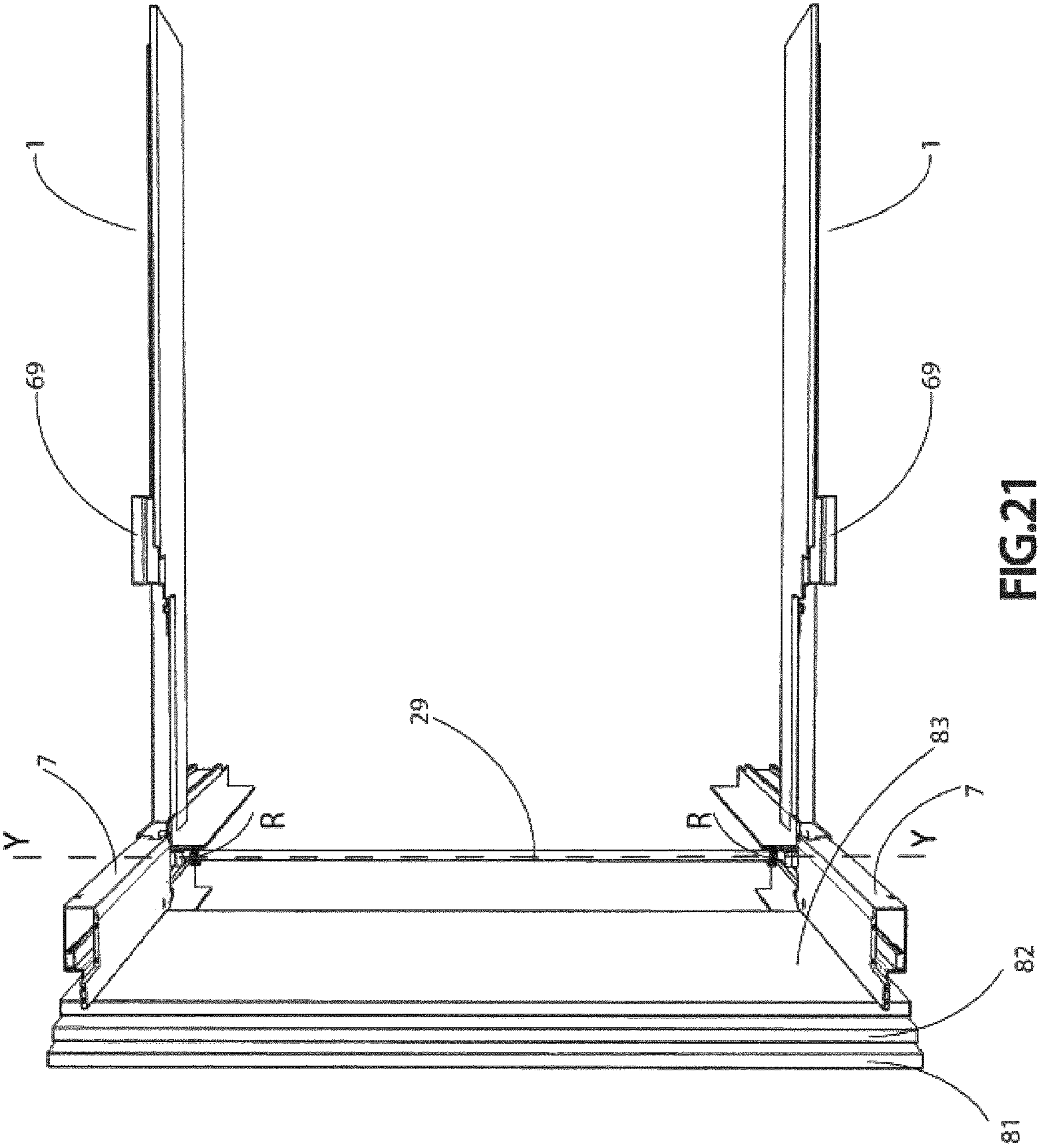
FIG. 21 is a diagrammatic axonometric view of a portion of the cabinet according to the invention, where the door panels are rotated by 90°.
Figure 22:
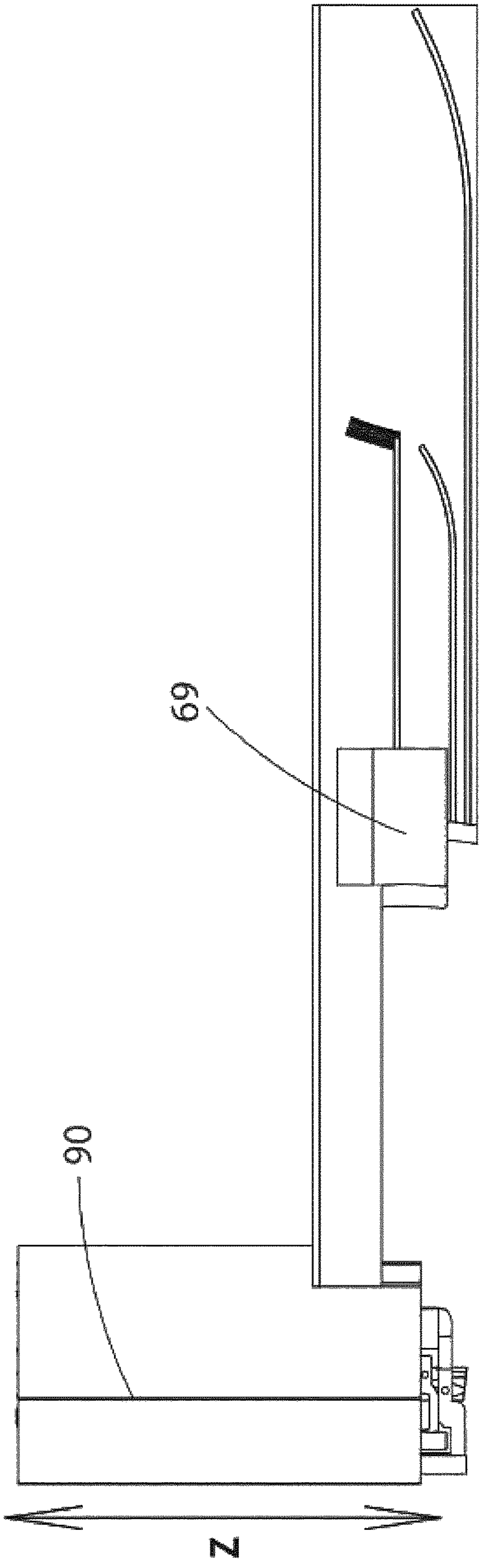
FIG. 22 is a diagrammatic top view of the cabinet according to the invention, with the door panels opened and disposed in adjacent position to a lateral wall of the cabinet.

With reference to FIGS. 20 to 22, the door panels (8) can be pushed towards a back wall of the cabinet in parallel direction (Z) to the lateral wall of the cabinet, in such a way that the door panels (8) do not protrude frontally from the cabinet. In view of the above, the door panels do not cause a front hindrance for the user when standing in front of the cabinet.

During such a sliding movement, the slider (15) of the second sliding means slides inside the slide (16) and the sprocket (57) of the second sliding means engages with the rack (17).

It must be noted that, by pushing the third door panel (81) towards the second door panel (82) with sufficient energy, all the door panels can be opened until they are disposed in retracted position near the lateral wall of the cabinet.

Advantageously, with reference to FIG. 22, the pin (R) of the rotation means of the two supporting frames is obtained with a single cylindrical vertical bar, in such a way to synchronize the movement of the second sliding means of the two supporting frames.

The synchronization of the movement of the second sliding means prevents the door panels (8) from oscillating during the sliding movement in a direction (Z) that is parallel to the lateral wall of the cabinet. Because of the supporting frames, the door panels (8) can be moved in such a way to provide a complete access to the compartment of the cabinet, without causing any front hindrance by the door panels (8).

Although not illustrated in the figures, the door panels-frame assembly may comprise only one sliding door panel or more than two sliding door panels. Moreover, the first sliding movement may comprise a bracket provided with only one slider suitable for sliding on a slide.

Although not illustrated in the figures, the door panels-frame assembly may be applied on window or door frames or wall cabinets or walls of a house in such a way to obtain slide-away walls.

Although not illustrated in the figures, the door panels-frame assembly may comprise only one supporting frame, which is fixed to the cabinet in upper position or in lower position.

Numerous variations and modifications can be made to the present embodiment of the invention, which are within the reach of an expert of the field, falling in any case within the scope of the invention as disclosed by the appended claims.

The invention claimed is:

1. A door panel frame assembly comprising:

a first door panel;

a second door panel slidable in relation to said first door panel, said first door panel being coplanar with said second door panel in a closed position;

a supporting frame affixed to said first door panel and said second door panel so as to movably support said first door panel and said second door panel, said supporting frame comprising:

a first sliding means connected to said second door panel such that said second door panel is slidable relative to said first door panel along a sliding direction, the sliding direction being parallel to a plane in which said second door panel lies in the closed position, said first sliding means comprising:
a slider affixed to said second door panel; and
a fixed slide in which said slider slides, wherein said fixed slide has an end section that is inclined relative to the sliding direction of said second door panel when moved by said first sliding means so as to push said second door panel outwardly when said second door panel is opened;
a rotation means affixed to said first door panel and adapted to cooperate with said first sliding means such that said first door panel and said second door panel rotate around an axis of a pin; and
a second sliding means comprising a fixed slide and a slide slidingly mounted on the fixed slide of said second sliding means and integrated with the pin of said rotation means such that said first door panel and said second door panel slide in direction of said second door panel when moved by said first sliding means, wherein said second sliding means further comprises a fixed frame with a sliding channel, the first door panel and the second door panel and said rotation means being slidable in the sliding channel, the sliding channel being of the fixed frame being partitioned into a first channel and a second channel, the first channel receiving a pair of pegs of said rotation means, said first door panel and said second door panel being slidable in the second channel.

2. The door panel frame assembly of claim 1, wherein the slider of said support member comprises ball bearings that are rollable in the slide of said second sliding means.

3. The door panel frame assembly of claim 1, wherein said second sliding means comprises a rack that engages a sprocket mounted on the pin of said rotation means.

4. A door panel frame assembly comprising:
a first door panel;
a second door panel slidable in relation to said first door panel, said first door panel being coplanar with said second door panel in a closed position;
a supporting frame affixed to said first door panel and said second door panel so as to movably support said first door panel and said second door panel, said supporting frame comprising:
a first sliding means connected to said second door panel such that said second door panel is slidable relative to said first door panel along a sliding direction, the sliding direction being parallel to a plane in which said second door panel lies in the closed position, said first sliding means comprising:
a slider affixed to said second door panel; and
a fixed slide in which said slider slides, wherein said fixed slide has an end section that is inclined relative to the sliding direction of said second door panel when moved by said first sliding means so as to push said second door panel outwardly when said second door panel is opened;
a rotation means affixed to said first door panel and adapted to cooperate with said first sliding means such that said first door panel and said second door panel rotate around an axis of a pin; and
a second sliding means comprising a fixed slide and a slide slidingly mounted on the fixed slide of said second sliding means and integrated with the pin of said rotation means such that said first door panel and said second door panel slide in direction of said second door panel when moved by said first sliding means, wherein said first sliding means comprises a first bracket affixed to said second door panel and to the slider of said first sliding means, the first bracket having a C-shape with a first arm affixed to said second door panel and a second arm parallel to the first arm and a connection arm perpendicular to the first arm and the second arm.

5. The door panel frame assembly of claim 4, wherein said rotation means comprises a mobile frame having a tubular shape, the tubular shape defining a housing, the mobile frame being affixed to said first door panel and adapted to receive the first bracket when said second door panel is in an open position.

6. The door panel frame assembly of claim 5, wherein the mobile frame has slides in which the slider of the first bracket slides.

7. The door panel frame assembly of claim 5, wherein the rotation means comprises a locking or unlocking means cooperative with the mobile frame, the locking or unlocking means for locking or unlocking a rotation of the mobile frame, said locking or unlocking means comprising:
an activation element having a pin adapted to contact said first sliding means so as to actuate the locking or unlocking means;
a locking element having a tooth insertable into a hole formed in the mobile frame; and
a driving element having a rod affixed to the pin of said activation element at one end by a lever mechanism and to the tooth of said locking element at another end thereof.

8. The door panel frame assembly of claim 7, wherein said locking or unlocking means further comprising:
a first spring disposed in correspondence to the pin of said activation element; and
a second spring disposed in correspondence to the tooth of said locking element.

9. A door panel frame assembly comprising:
a first door panel;
a second door panel slidable in relation to said first door panel, said first door panel being coplanar with said second door panel in a closed position;
a supporting frame affixed to said first door panel and said second door panel so as to movably support said first door panel and said second door panel, said supporting frame comprising:
a first sliding means connected to said second door panel such that said second door panel is slidable relative to said first door panel along a sliding direction, the sliding direction being parallel to a plane in which said second door panel lies in the closed position, said first sliding means comprising:
a slider affixed to said second door panel; and
a fixed slide in which said slider slides, wherein said fixed slide has an end section that is inclined relative to the sliding direction of said second door panel when moved by said first sliding means so as to push said second door panel outwardly when said second door panel is opened;
a rotation means affixed to said first door panel and adapted to cooperate with said first sliding means such that said first door panel and said second door panel rotate around an axis of a pin; and
a second sliding means comprising a fixed slide and a slide slidingly mounted on the fixed slide of said second sliding means and integrated with the pin of said rotation means such that said first door panel and said second door panel slide in direction of said second door panel when moved by said first sliding means;

a third door panel slidably mounted relative to said second door panel in a sliding direction of said second door panel when moved by said first sliding means, said first sliding means being affixed to said third door panel, said first sliding means further comprising:

a second bracket fixed to said third door panel and to a slider mounted on said fixed slide, said second bracket having an end section that is inclined relative to the sliding direction of said second door panel when moved by said first sliding means so as to push said third door panel outwardly when opened.

10. The door panel frame assembly of claim 9, wherein said first sliding means has a synchronization means fixed to said second door panel and said third door panel for synchronizing a sliding of said second door panel and of said third door panel toward said first door panel, the synchronization means comprising:

a first rack disposed on said second bracket;

a second rack that is fixed; and a sprocket revolvingly mounted in a cylindrical housing of said first bracket and engageable with said first rack and said second rack.

11. The door panel frame assembly of claim 10, wherein said second bracket has a diverter with a wall that is inclined relative to the sliding direction of said second door panel when moved by said first sliding means, the wall being directed toward an inclined free end of said second bracket so as to define a gap between the inclined free end of the second bracket and the wall of the diverter, the gap being inclined relative to the sliding direction of said second door panel when moved by said first sliding means so as to allow said sprocket to pass therethrough.

12. The door panel frame assembly of claim 10, wherein said mobile frame has a rack disposed in a housing, the rack being continuous and aligned with said second rack of said synchronization means when said first door panel is opened.

* * * * *